United States Patent [19]
Lidgett et al.

[11] Patent Number: 5,768,496
[45] Date of Patent: Jun. 16, 1998

[54] METHOD AND APPARATUS FOR OBTAINING A DURABLE FAULT LOG FOR A MICROPROCESSOR

[75] Inventors: Rosemary Lidgett, Wollstonecraft; Stefan Keller-Tuberg, Kareela; Vinay Deo, Meadowbank; Joseph Nour, Eastlakes; Peter Field, Lane Cove, all of Australia

[73] Assignee: Alcatel Australia Limited, Sydney, Australia

[21] Appl. No.: 373,644

[22] Filed: Jan. 17, 1995

[30] Foreign Application Priority Data

Jan. 20, 1994 [AU] Australia ................ PM 3487

[51] Int. Cl.$^6$ ............... G06F 11/30; G06F 11/00
[52] U.S. Cl. ................. 395/183.01; 395/184.01
[58] Field of Search ............ 371/62, 67.1; 395/183.01, 395/183.02, 183.03, 183.06, 184.01, 182.2

[56] References Cited

U.S. PATENT DOCUMENTS

| | | | |
|---|---|---|---|
| 4,639,917 | 1/1987 | Furuta | 371/16.1 |
| 4,809,280 | 2/1989 | Shonaka | 371/62 |
| 4,829,520 | 5/1989 | Toth | 371/22.1 |
| 4,956,807 | 9/1990 | Hosaka et al. | 371/62 |
| 5,197,026 | 3/1993 | Butler | 365/104 |
| 5,245,615 | 9/1993 | Tvev | 395/183.21 |
| 5,392,879 | 2/1995 | Boyce et al. | 371/25.1 |

FOREIGN PATENT DOCUMENTS

| | | |
|---|---|---|
| 0 283 196 | 9/1988 | European Pat. Off. . |
| 0 517 403 | 12/1992 | European Pat. Off. . |
| 33 35 548 | 4/1985 | Germany . |
| 60-222937 | 7/1985 | Japan . |
| 60-222937 | 11/1985 | Japan . |

OTHER PUBLICATIONS

IBM Technical Disclosure Bulletin, vol. 29, No. 10, Mar. 1987 New York, US, pp. 4489-4491, "Method Of Saving Error Data".

*Primary Examiner*—Hoa T. Nguyen
*Attorney, Agent, or Firm*—Frishauf, Holtz, Goodman, Langer & Chick

[57] ABSTRACT

A microprocessor fault logging arrangement includes a detector for detecting hardware and software faults 3, 4, 8, which produce an interrupt signal which is applied to the non-maskable interrupt input NMI of microprocessor 1 and, which is also applied via delay circuit 5, to the RESET input of microprocessor 1. The NMI input causes microprocessor 1 to store the state of selected system parameters in a log of fault records stored in a non-volatile memory 2, the selected parameters being stored for fault analysis each time an NMI input signal is generated interrupt signal is applied to the NMI input. The delay circuit 5 allows sufficient time for the selected parameters to be stored in the non-volatile memory 2 before the microprocessor is reset.

10 Claims, 2 Drawing Sheets

METHOD AND APPARATUS FOR OBTAINING A DURABLE FAULT LOG FOR A MICROPROCESSOR

BACKGROUND OF THE INVENTION

This invention relates to an improved method and arrangement for logging fault analysis data in a microprocessor controlled system.

A microprocessor system commences operation by "executing" a reset sequence which is triggered by a "reset" signal provided by hardware.

The microprocessor reset sequence initialises the hardware and software sub-systems including the health check mechanism(s). The microprocessor health check mechanisms may be implemented in hardware and/or software.

Hardware mechanisms may be integral within the microprocessor component (e.g., check for illegal instruction) or external (e.g. check for an illegal address, memory protection violation or watchdog timer expiry).

Software mechanisms may be applied to verify the correct operation of hardware (e.g., ROM checksum tests) or to verify the correct operation of software (e.g., data bounds tests).

Hardware mechanisms are always active and operating. Software mechanisms are executed from time to time regularly and frequently; for example,—1% of total available microprocessor time. This may include defining protected and illegal memory areas and resetting the system watchdog timer.

The microprocessor commences normal operation as defined by the instructions stored in a program store 6 of FIG. 1. On a regular basis, the health checking dictates activities such as:

a) resetting the watchdog timer arrangement b) measuring or examining critical system parameters in order to deter-nine the health state of the overall system. This may include such activities as calculating and verifying RAM/ROM/EEPROM checksums, verifying that certain expected events have taken place, verifying the correct state of critical system data or peripherals etc.

c) confirming that memory and peripheral accesses are to legal memory addresses only.

For as long as the health checks continue to indicate that the system is behaving normally and correctly, the microprocessor is permitted to continue executing the normal sequence of instructions.

If any one of the numerous system health check mechanisms indicate a fault, a special sequence of instructions is immediately executed in order to log as much information about the fault as possible.

In past systems, the logging of error log information has been to a volatile storage device in the microprocessor system.

In known fault logging arrangements, detection of a fault such as processor lock-up initiates the recording in RAM of selected data indicating the condition of various entities associated with the processor at the time of fault. This information can be subsequently downloaded from the RAM so the condition existing at the time of the fault can be analyzed. However, because RAM is volatile, the information is lost if the circuit board is unplugged from its power source, or if by nature of the software fault, or because there are multiple faults, the RAM is overwritten. This can happen, for instance, when the microprocessor board is part of a telecommunication system and the board is removed and replaced because it is faulty. Faulty boards are returned to the laboratory for analysis and repair but the fault condition data is lost when the board is unplugged.

Another problem with storing the fault data in RAM is that the microprocessor may be fitted with a watchdog timer arrangement. A watchdog timer (WDT) responds to a processor fault such as a loop condition which locks up the processor, by generating a re-boot signal to re-initialize the processor. In some systems, this may cause the information stored in RAM to be erased or the state of critical system peripherals to be reset/reinitialized.

SUMMARY OF THE INVENTION

It is an object of the present invention to provide a microprocessor fault logging arrangement including a microprocessor connected by a communication bus to a non-volatile memory and to a health check arrangement, the purpose of the non volatile memory being to store a log of fault records which record the restart history of the microprocessor, wherein the "error output" of the health check arrangement is applied to a first input of the microprocessor to cause condition data indicating the condition of various entities associated with the microprocessor to be recorded in the non-volatile memory when the health check output generates an error signal, the arrangement including a delay means to which the error signal is applied, the output of the delay means being applied to the reset input of the microprocessor, the delay of the delay means being sufficient to permit the condition data to be recorded in the non-volatile memory before the error signal is applied to the reset input of the microprocessor.

The condition data stored may include e.g.:

type of fault (watchdog, illegal instruction, access to protected memory etc)

key data variables particular for each type of fault time of day/date microprocessor and/or peripheral registers microprocessor stack or part thereof instruction executing at time of fault application process executing at the time of fault source code line number and filename in which fault was detected version identifier or the software image executing at the time of fault.

etc.

It is a feature of the present invention that the fault records stored in the non-volatile memory can contain a wide variety of information such that from analysis, the nature of the fault may be established as a software or hardware failure and that the cause can as much as possible be uniquely identified. With fault information permanently recorded, the entire performance history of the microprocessor controlled system can be interrogated either while the system is commissioned and active, or when it is returned with suspected faults for repairs. The non volatile store is designed to be sufficiently large to contain a large number of fault records so that if the microprocessor is returned or interrogated, an accurate performance history can be determined.

DETAILED DESCRIPTION

Figure 1:
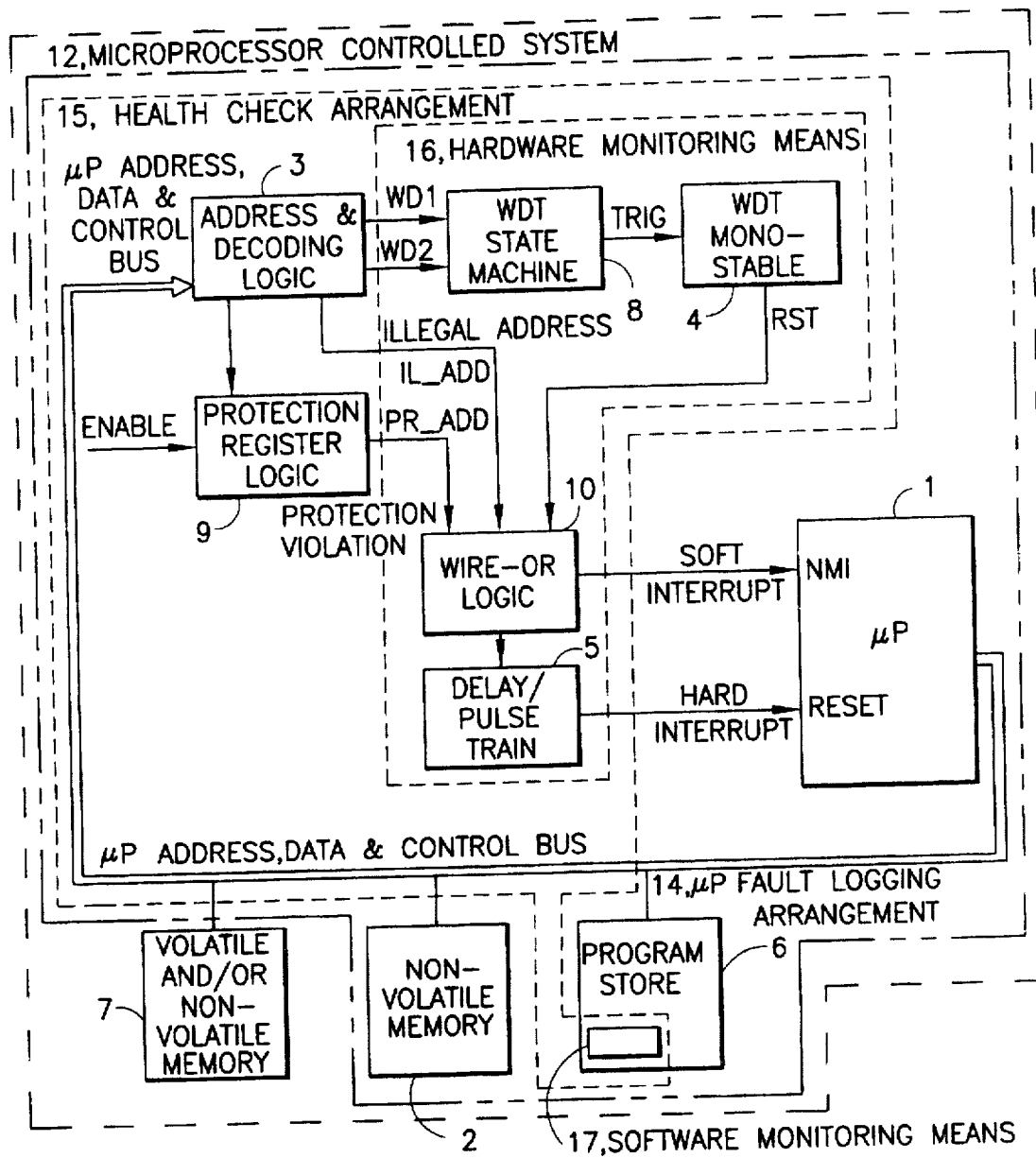
FIG. 1 is a block diagram of an arrangement embodying the invention.

FIG. 1 shows an embodiment of the invention comprising a microprocessor (µp) 1 connected by a communication bus 11 to a non-volatile memory 2 such as an EEPROM, and to address and decoding logic 3 which may be part of microprocessor 1 in a microprocessor controlled system 12. The watchdog outputs WD1 and WD2 from decoding logic 3 are applied to WDT monostable circuit 4 via WDT state machine 8 and the output of WDT monostable circuit 4 is applied via OR logic 10 to a first input NMI (non-Maskable interrupt) of microprocessor 1, and, via delay 5, to the RESET input of microprocessor 1. Additional fault condition signals indicating e.g., an illegal address or a hardware fault are also applied to inputs of OR logic 10 via protection register logic 9. The microprocessor executes a sequence of instructions defined in program Store 6 and other devices such as volatile or/and non-volatile microprocessor memory 7 may also be connected to the communication bus 11.

The operation of the arrangement of FIG. 1 will be described with reference to FIG. 2.

In step 5 (Power Up), microprocessor 1 accesses application routines stored in program Store 6 and as an application routine is completed the microprocessor executes a housekeeping routine which includes health check (Step S5) instructions stored at a specific address in program Store 6. In the case of watchdog time refresh code, the WDT instructions are decoded in decoder 3 of FIG. 1 which generates a reset signal WD1 which is applied to WDT monostable 4. In normal operation, WDT monostable 4 has an output RST in a first state e.g. low. However if the processor becomes locked up e.g. by continuously executing a loop involving an application routine, with the result that the WDT routine is not executed, the WDT monostable times out and its output RST changes state to high.

This change of state is recognized by microprocessor 1 via non-maskable interrupt input NMI and this sensed change of state at input NMI causes the state of selected operational entities to be stored in a defined location in Non volatile store EEPROM 2

Signal RST is then applied to delay 5 which generates one or more reset pulses which are applied to the RESET input of microprocessor 1. This causes the microprocessor to re-boot. However the fault log information is retained in the non-volatile memory 2.

This arrangement enables a continuous log of fault conditions to be stored in non-volatile memory 2 such as EEPROM, disc, tape, a new entry being added each time the OR logic 10 generates an error signal. Because the fault log is stored in non-volatile memory 2, the board can be unplugged in the field and returned to the laboratory for analysis without loss of data, or special application software within the Commissioned microprocessor system itself can interrogate its own error log and transmit the information for remote analysis.

Operation of the fault logging arrangement 14 will now be explained with reference to FIGS. 1 and 2.

Most microprocessors are provided with a non-maskable interrupt input NMI. This interrupt overrides any routine the processor is performing and initiates a specific routine. In the present invention the NMI routine causes the microprocessor to record status reports of the selected operational conditions of the system in EEPROM, of nonvolatile memory 2.

Figure 2:
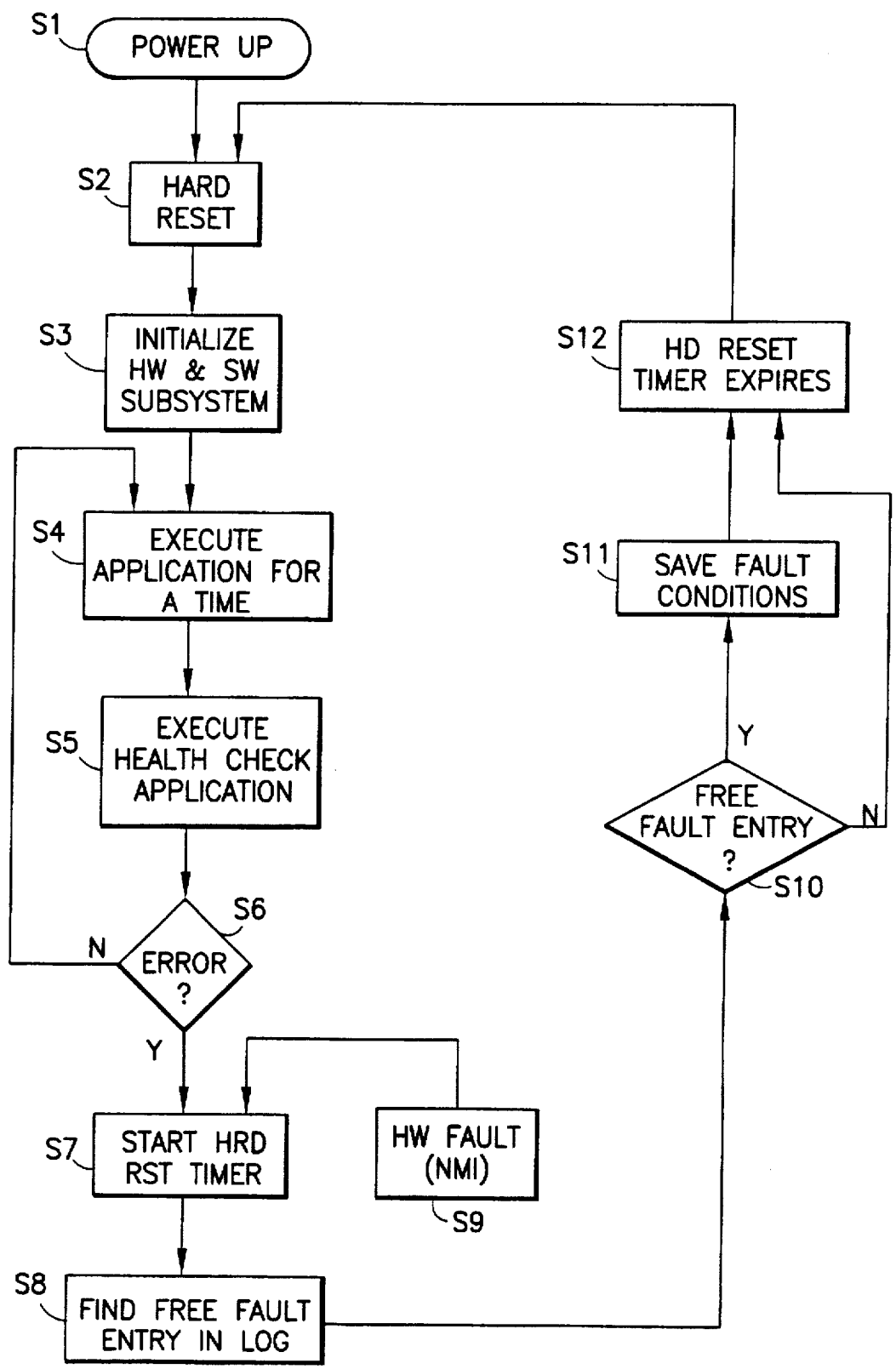
FIG. 2 is a chart showing the operation of the arrangement of FIG. 1.

FIG. 2 shows the operation of the arrangement from initialization of the microprocessor.

When the system is first powered up in Step S1, a hard reset is generated in Step S2 which ensures that the system is put into a specified condition. The initialization of hardware and software subsystems in Step S3 includes functions such as, defining memory addresses for peripherals and volatile+non volatile memory and the enabling or disabling of specified functions.

In Step S4, the microprocessor commences running a preprogrammed application and carries out regular "health checks" to ensure the hardware and software are functioning correctly. A health check arrangement 15 includes hardware monitoring means 16, software monitoring means 17, address decoding logic 3 and protection register logic 9. Hardware monitoring means 16 is formed by WDT state machine 8, monostable circuit 4, OR logic 10 and delay 5. Software monitoring means 17 is formed as part of the software in program store 6. If the health check indicates correct operation in Step S5, the microprocessor returns to running its application routines (returns to Step S4). However, if a fault is detected (in Step S6) either via the watchdog timer circuitry 8, 4, or other health check arrangements, the OR logic 10 produces an error signal output which is applied to the NMI input of microprocessor 1 (Step S9—which checks for hardware faults) and the microprocessor is switched to the predetermined fault condition save routine Steps S7 through S11 in FIG. 2.

The fault condition save routine begins in Steps S5–S7 by delaying the error output in logic 10 by a time sufficient to store operational parameters of operational entities in the system when the error occurred. Next, the system, for example, may search for the next available fault record register which occurs in Step S8. If an empty fault record register in the EEPROM (non-volatile memory 2) is found, the microprocessor saves the specified states of the system and then waits (Step S12) for the hard reset timer delay period (set in Step S7) to expire, after which a hard reset is initiated (Step S2) by an output generated in Step S12.

We claim:

1. In a microprocessor controlled system, a microprocessor controlled fault logging arrangement for logging at least one of hardware and software faults that occur during an operation of the microprocessor controlled system, comprising:

a non-volatile memory;

a health check arrangement;

a microprocessor connected via a communication bus to the non-volatile memory and to said health check arrangement which produces an error output upon detection of a fault that occurs during operation of the microprocessor controlled system, wherein the error output of the health check arrangement is applied from said health check arrangement through said communication bus to a first input of the microprocessor to cause condition data indicating a condition of a plurality of operational entities associated with the microprocessor to be sent from said microprocessor through said communication bus and to be recorded in the non-volatile memory when the health check arrangement generates the error output; and delay means for delaying the error output of the health check arrangement, said delay means having an input to receive the error output of the health check arrangement, and for delaying the error output, an output for coupling a delayed error output of the health check arrangement to a reset input of the microprocessor, said delay means providing a time delay sufficient to permit the condition data of the plurality of operational entities to be recorded in the non-volatile memory before the delayed error output at the output of said delay means activates said reset input of the microprocessor; and wherein said health check arrangement includes:

hardware monitoring means for monitoring operation of said microprocessor controlled system and for producing at least one first fault signal in response to detection of at least one corresponding fault condition; and software monitoring means for monitoring operation of the microprocessor controlled system and for producing at least one second fault signal in response to detection of at least one corresponding fault condition; and the microprocessor controlled fault logging arrangement further including an OR logic means for producing the error output in response to each fault signal.

2. The fault logging arrangement of claim 1, wherein the first input of the microprocessor is a non-maskable interrupt (NMI) input.

3. The fault logging arrangement of claim 1, wherein the health check arrangement includes:

a watchdog timer circuit connected via said communication bus to the microprocessor, and the watchdog timer circuit being adapted to monitor the operation of the microprocessor, wherein the microprocessor routinely runs a lock-up test routine and transmits a watchdog timer reset signal when the lock-up test routine indicates that the microprocessor is not locked-up; and wherein:

the watchdog timer reset signal resets the watchdog timer circuit and prevents the watchdog timer circuit from timing out and generating a watchdog lock-up error signal; and when the lock-up test routine fails to transmit the watchdog timer reset signal within a period determined by the watchdog timer circuit, the watchdog timer circuit generates the lock-up error signal which is applied to the OR logic means to produce the error output.

4. The fault logging arrangement of claim 3, wherein the first input of the microprocessor is a non-maskable interrupt (NMI) input.

5. The fault logging arrangement of claim 3, wherein the first input of the microprocessor is a non-maskable interrupt input.

6. In a method of obtaining a non-volatile log of hardware and software faults that occur during an operation of a microprocessor controlled system that includes a microprocessor, a communication bus, a non-volatile memory, a health check arrangement and an OR logic means, the microprocessor being connected via the communication bus to the non-volatile memory and to the health check arrangement, the improvement comprising:

monitoring an operation of the microprocessor controlled system by the health check arrangement;

producing an error signal each time one of a hardware and a software fault is detected by the health check arrangement;

applying said error signal to the OR logic means to select each error signal;

applying each selected error signal outputted from the OR logic means to a non-maskable interrupt input of the microprocessor to initiate a fault condition save routine wherein the microprocessor causes conditions of selected parameters in the microprocessor controlled system to be stored in the non-volatile memory;

delaying the error signal produced by the health check arrangement while the fault condition save routine is being carried out; then applying a delayed error signal to a reset input of the microprocessor to cause the microprocessor to reset the microprocessor controlled system after completion of the fault condition save routine; and transmitting at least a portion of the contents of an error log in the non-volatile memory to a remote location for analysis.

7. The method of claim 6, further comprising the steps of:

routinely running a lock-up test routine in the microprocessor and transmitting a watchdog timer reset signal from a watchdog timer circuit, which is part of the health check arrangement, when the lock-up test routine indicates that the microprocessor is not locked-up;

resetting the watchdog timer circuit with the watchdog timer reset signal, for preventing the watchdog timer circuit from timing out and generating a lock-up error signal; and generating, in the watchdog timer circuit when the lock-up test routine fails to transmit the watchdog timer reset signal within a period determined by the watchdog timer circuit, the lock-up error signal which is applied to the OR logic means from the watchdog timer circuit to produce the error output.

8. In a microprocessor controlled system, a microprocessor controlled fault logging arrangement for logging at least one of hardware and software faults that occur during an operation of the microprocessor controlled system, comprising:

a non-volatile memory;

a health check arrangement;

a microprocessor connected via a communication bus to the non-volatile memory and to said health check arrangement which produces an error output upon detection of a fault that occurs during operation of the microprocessor controlled system, wherein the error output of the health check arrangement is applied from said health check arrangement through said communication bus to a first input of the microprocessor to cause condition data indicating a condition of a plurality of operational entities associated with the microprocessor to be sent from said microprocessor through said communication bus and to be recorded in the non-volatile memory when the health check arrangement generates the error output; and delay means for delaying the error output of the health check arrangement, said delay means having an input to receive the error output of the health check arrangement, and an output for coupling a delayed error output of the health check arrangement to a reset input of the microprocessor, said delay means providing a time delay sufficient to permit the condition data of the plurality of operational entities to be recorded in the non-volatile memory before the delayed error output at the output of said delay means activates said reset input of the microprocessor; and wherein said health check arrangement includes:

hardware monitoring means for monitoring operation of said microprocessor controlled system and for producing at least one first fault signal in response to detection of at least one corresponding fault condition; and software monitoring means for monitoring operation of the microprocessor controlled system and for producing at least one second fault signal in response to detection of at least one corresponding fault condition; and the microprocessor controlled fault logging arrangement further including an OR logic means for producing the error output in response to each fault signal; and wherein the microprocessor is programmed to interrogate an error log corresponding to information of said detected fault conditions and to transmit the error log information to a remote location for analysis.

9. The fault logging arrangement of claim 8, wherein the first input of the microprocessor is a non-maskable interrupt input.

10. The fault logging arrangement of claim 8, wherein the health check arrangement includes:

a watchdog timer circuit connected via said communication bus to the microprocessor, and the watchdog timer circuit being adapted to monitor the operation of the microprocessor, wherein the microprocessor routinely runs a lock-up test routine and transmits a watchdog timer reset signal when the lock-up test routine indicates that the microprocessor is not locked-up; and wherein:

the watchdog timer reset signal resets the watchdog timer circuit and prevents the watchdog timer circuit from timing out and generating a watchdog lock-up error signal; and when the lock-up test routine fails to transmit the watchdog timer reset signal within a period determined by the watchdog timer circuit, the watchdog timer circuit generates the lock-up error signal which is applied to the OR logic means to produce the error output.

* * * * *

UNITED STATES PATENT AND TRADEMARK OFFICE
CERTIFICATE OF CORRECTION

PATENT NO. : 5,768,496
DATED : June 16, 1998
INVENTOR(S) : LIDGETT et al.

It is certified that error appears in the above-identified patent and that said Letters Patent is hereby corrected as shown below:

On the Title page:

Item [56] References Cited, under U.S. PATENT DOCUMENTS, insert:

--4,463,418   7/1984   O'Quin II et al--.

Item [57] ABSTRACT, lines 9-10, delete:

"NMI input signal is generated"

Signed and Sealed this

Sixth Day of April, 1999

Attest:

Q. TODD DICKINSON

*Attesting Officer*    *Acting Commissioner of Patents and Trademarks*